(12) United States Patent
Arakawa

(10) Patent No.: US 11,782,664 B2
(45) Date of Patent: Oct. 10, 2023

(54) IMAGE FORMING APPARATUS HAVING MANAGING APPARATUS WHICH CREATES PRINT GROUPS ACCORDING TO SPEED AND ASSOCIATES PRINT GROUPS TO A CONTINUOUS PAPER STRIP

(71) Applicant: FUJIFILM BUSINESS INNOVATION CORP., Tokyo (JP)

(72) Inventor: Kei Arakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 395 days.

(21) Appl. No.: 16/895,405

(22) Filed: Jun. 8, 2020

(65) Prior Publication Data
US 2021/0103416 A1    Apr. 8, 2021

(30) Foreign Application Priority Data
Oct. 4, 2019    (JP) ................... 2019-184123

(51) Int. Cl.
  *G03G 15/00*    (2006.01)
  *G06F 3/00*    (2006.01)
  *G06F 3/12*    (2006.01)

(52) U.S. Cl.
  CPC ......... *G06F 3/1296* (2013.01); *G03G 15/50* (2013.01); *G03G 15/5083* (2013.01); *G03G 15/6517* (2013.01); *G06F 3/1262* (2013.01)

(58) Field of Classification Search
  CPC ............ G03G 15/50; G03G 15/5008; G03G 15/6517; G03G 15/652; G03G 2215/00455; G03G 2215/00949; G03G 15/5083; B41J 11/51; B41J 13/0009; B41J 15/00; G06F 3/1262; G06F 3/1296

USPC ............... 399/77, 82, 85, 384, 396
  See application file for complete search history.

(56) References Cited

U.S. PATENT DOCUMENTS

| | | | |
|---|---|---|---|
| 6,256,463 B1 * | 7/2001 | Manzer | G03G 15/00 271/301 |
| 7,139,085 B1 * | 11/2006 | Sakaguchi | G06Q 10/06 358/1.15 |
| 8,384,927 B2 | 2/2013 | Harmon et al. | |
| 2011/0228324 A1 * | 9/2011 | To | G06F 3/1247 358/1.15 |
| 2020/0081674 A1 * | 3/2020 | Fukami | G06F 3/1268 |
| 2021/0055894 A1 * | 2/2021 | Noguchi | G06F 3/1215 |
| 2021/0064305 A1 * | 3/2021 | Kikumoto | G06F 3/1205 |

FOREIGN PATENT DOCUMENTS

| | | | |
|---|---|---|---|
| EP | 2017719 A2 * | 1/2009 | ........ G06F 3/1211 |
| JP | 2011-213098 A | 10/2011 | |
| JP | 5101147 B2 | 12/2012 | |
| JP | 2018-202754 A | 12/2018 | |

OTHER PUBLICATIONS

Jun. 20, 2023 Office Action issued in Japanese Patent Application No. 2019-184123.

* cited by examiner

Primary Examiner — Robert B Beatty
(74) Attorney, Agent, or Firm — Oliff PLC

(57) ABSTRACT

A managing apparatus includes a processor configured to use continuous paper strips as recording media, receive multiple print jobs having different print speeds, and create print groups into which the multiple print jobs are classified according to print speed.

9 Claims, 13 Drawing Sheets

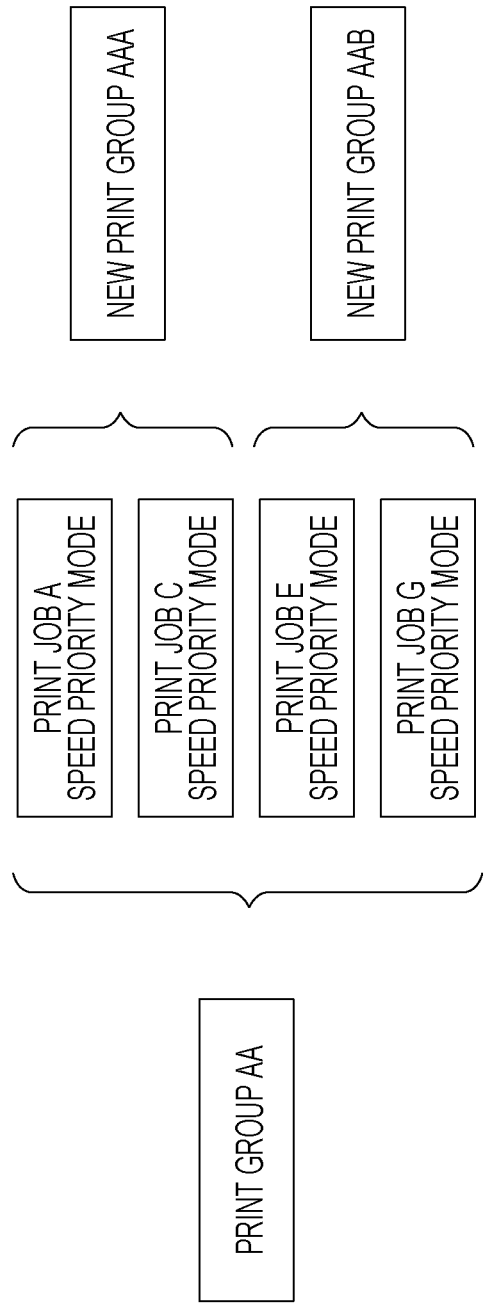

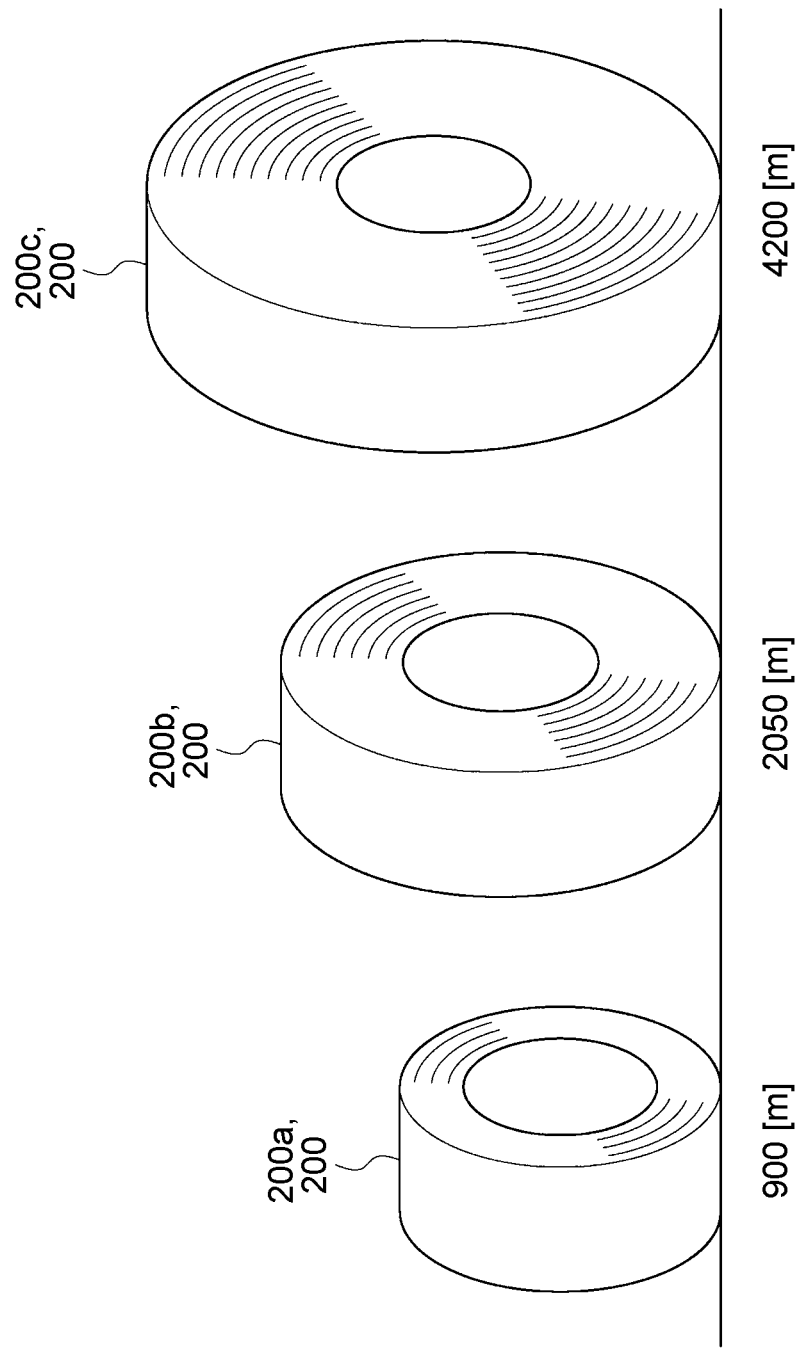

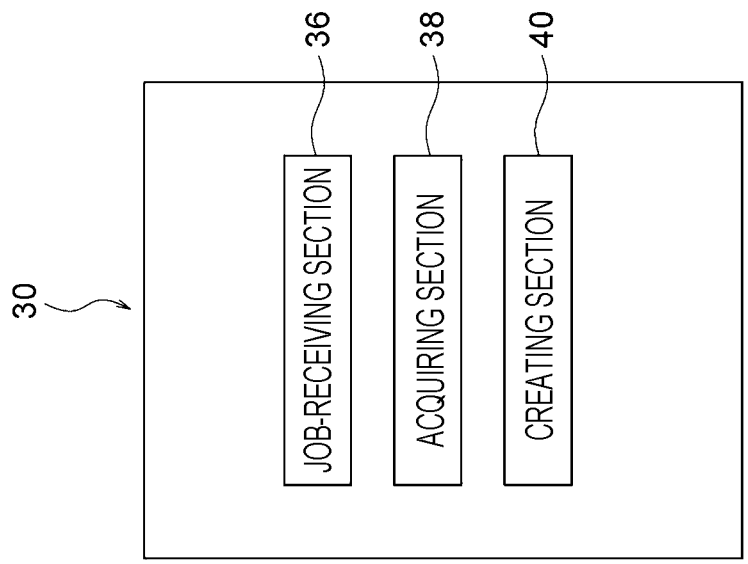
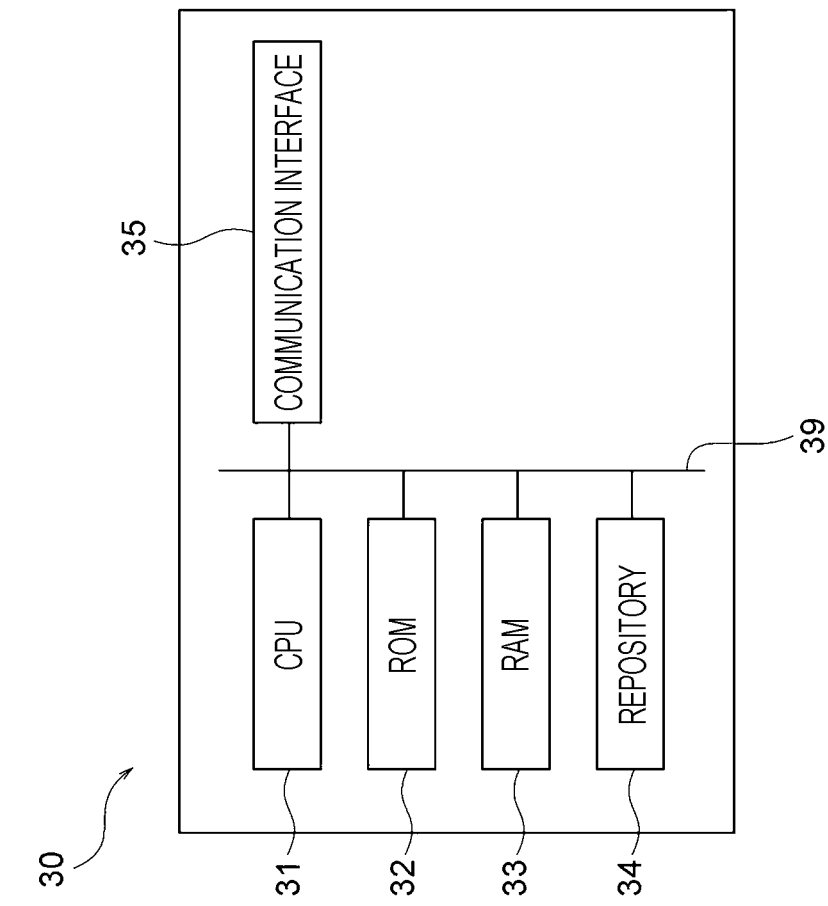

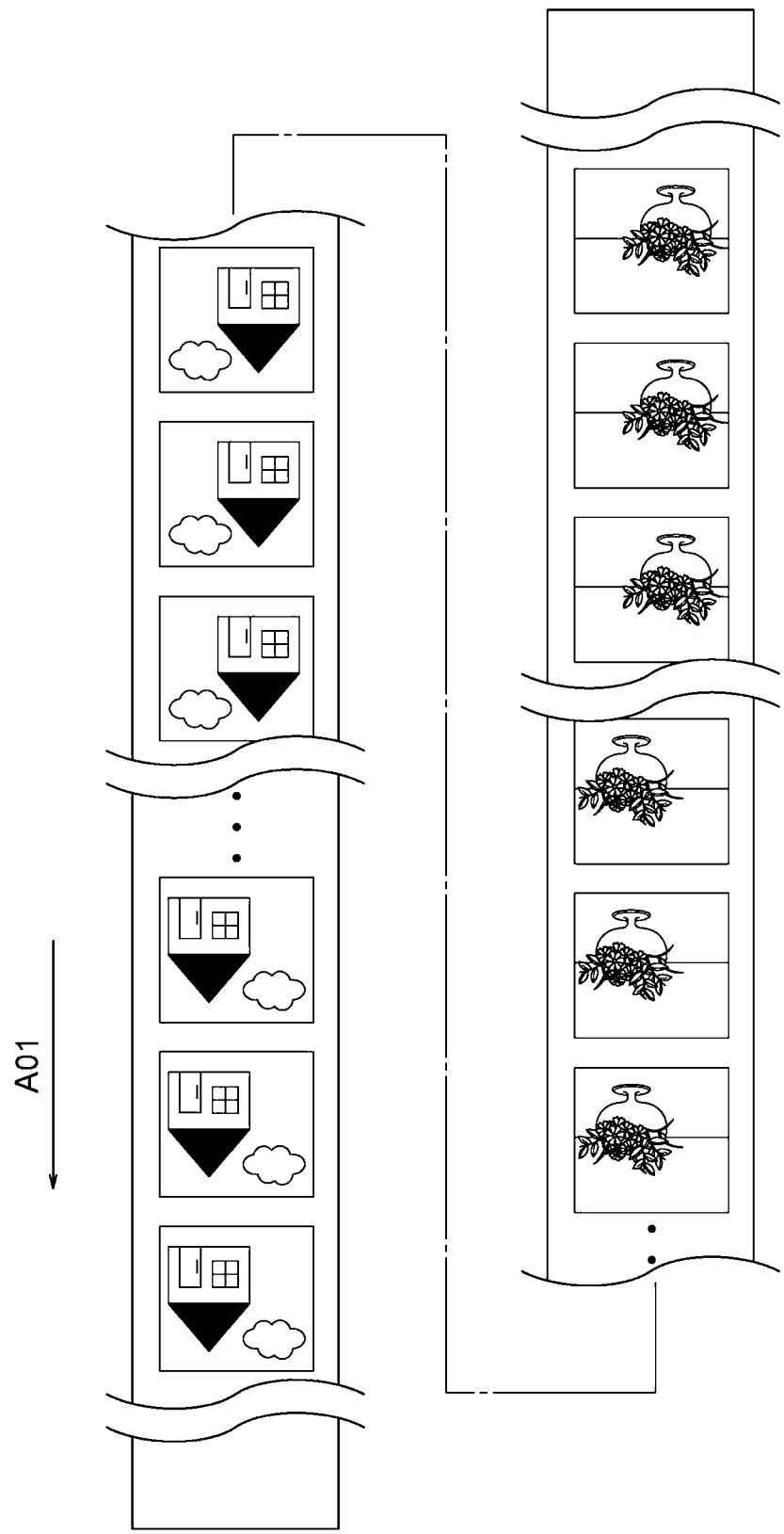

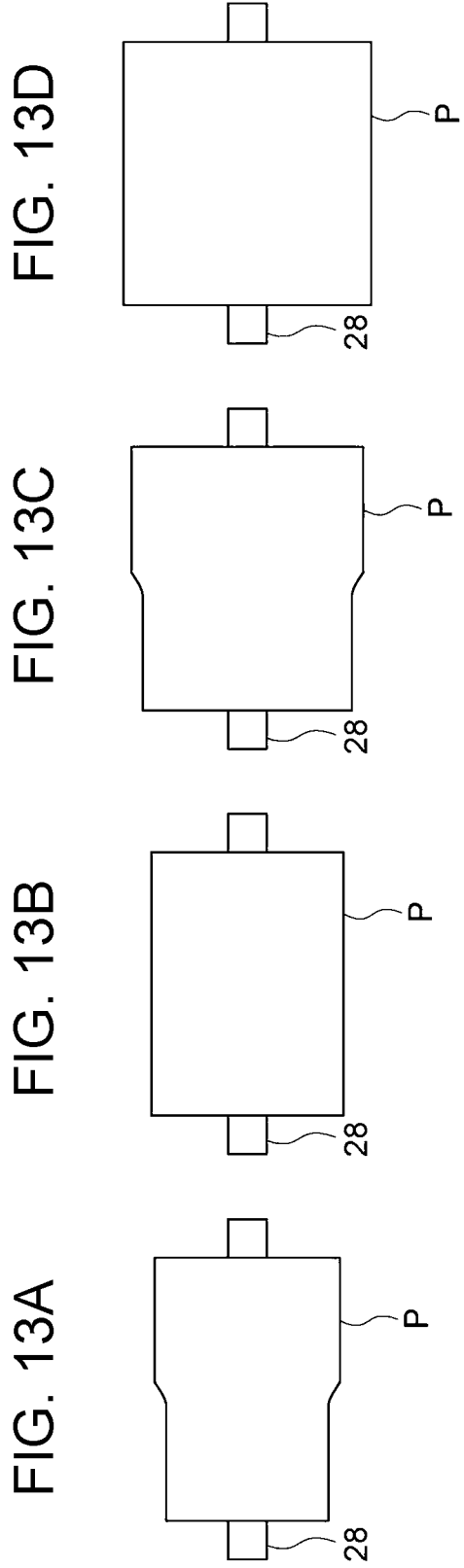

IMAGE FORMING APPARATUS HAVING MANAGING APPARATUS WHICH CREATES PRINT GROUPS ACCORDING TO SPEED AND ASSOCIATES PRINT GROUPS TO A CONTINUOUS PAPER STRIP

CROSS-REFERENCE TO RELATED APPLICATIONS

This application is based on and claims priority under 35 USC 119 from Japanese Patent Application No. 2019-184123 filed Oct. 4, 2019.

BACKGROUND

(i) Technical Field

The present disclosure relates to a managing apparatus, a non-transitory computer readable medium storing a program, and an image forming unit.

(ii) Related Art

An image forming apparatus according to Japanese Unexamined Patent Application Publication No. 2018-202754 includes an image forming section and a controller. The image forming section forms an image on a continuous paper strip in accordance with a job. The controller sets a feature value, which is needed for a postprocessor, by using the print setting information provided by the job and controls the image forming section so that a specified job and the adjacent job are placed a distance apart on the continuous paper strip, the distance being determined in accordance with the feature value.

SUMMARY

A managing apparatus controls print jobs, which are print directions to form images on a continuous paper strip. In response to a plurality of print jobs that are received, a managing apparatus known in the related art controls the print jobs so as to perform the print jobs (form images) on a continuous paper strip in the order in which the print jobs are received.

For example, in response to print jobs that have different print speeds and that are received in succession, a managing apparatus controls the print jobs so as to perform the print jobs having different print speeds in succession on a continuous paper strip. Thus, while the print jobs are performed on a continuous paper strip, the print speed is changed during the printing. In such a case, if two print jobs have different print speeds, an unused region (wasted portion) in which no image is formed is generated between images formed by one of the two print jobs and images formed by the other of the two print jobs.

Aspects of non-limiting embodiments of the present disclosure relate to causing an unused region in which no image is formed and that is generated on a continuous paper strip to become smaller than in a case where print jobs having different print speeds are performed on the continuous paper strip in the order in which the print jobs are received.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a managing apparatus including a processor configured to use continuous paper strips as recording media, receive a plurality of print jobs having different print speeds, and create print groups into which the plurality of print jobs are classified according to print speed.

BRIEF DESCRIPTION OF THE DRAWINGS

Exemplary embodiments of the present disclosure will be described in detail based on the following figures, wherein:

FIG. 3 is an illustration used to describe the managing flow of print jobs that are performed by the managing apparatus according to the first exemplary embodiment of the present disclosure;

FIG. 5 is a perspective view depicting supply rolls on which print jobs are performed by the managing apparatus according to the first exemplary embodiment of the present disclosure;

FIGS. 6A and 6B are block diagrams depicting a hardware configuration and a functional configuration, respectively, of the managing apparatus according to the first exemplary embodiment of the present disclosure;

FIG. 12 is an illustration used to describe images that are formed on a continuous paper strip by print jobs that are performed by the managing apparatus according to the third exemplary embodiment of the present disclosure; and FIGS. 13A, 13B, 13C, and 13D are each an illustration used to describe a continuous paper strip rolled around a winding reel during a print job performed by the managing apparatus according to the third exemplary embodiment of the present disclosure.

DETAILED DESCRIPTION

First Exemplary Embodiment

An example of a managing apparatus and an image forming unit according to a first exemplary embodiment of the present disclosure will be described with reference to FIGS. 1 to 8. In the figures, the same or equivalent components and parts are denoted by the same reference signs. The proportions in the figures are exaggerated for the sake of description and are not necessarily drawn to scale.

Figure 8:
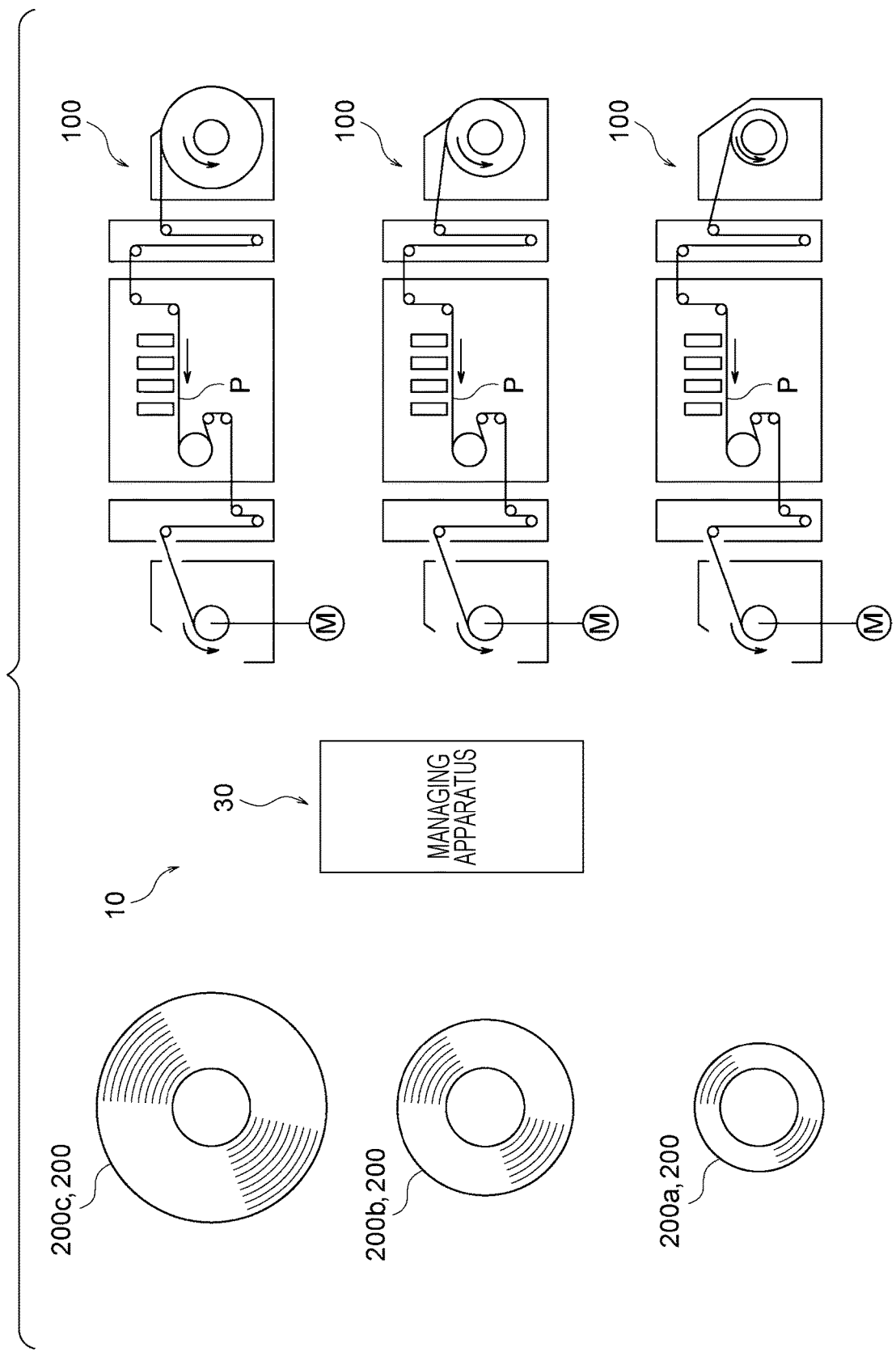
FIG. 8 is a schematic illustration depicting the image forming unit according to the first exemplary embodiment of the present disclosure.

FIG. 8 is an illustration depicting a schematic configuration of an image forming unit 10 that includes a managing apparatus 30 according to the present exemplary embodiment and supply rolls 200 each of which has a rolled continuous paper strip P on which print jobs controlled by the managing apparatus 30 are to be performed.

Overall Configuration

As depicted in FIG. 8, the image forming unit 10 includes the managing apparatus 30 and a plurality of image forming apparatuses 100. The managing apparatus 30 receives and controls a plurality of print jobs. Each of the plurality of image forming apparatuses 100 executes print jobs controlled by the managing apparatus 30 and forms images on a continuous paper strip P.

Image Forming Apparatus 100

Figure 7:
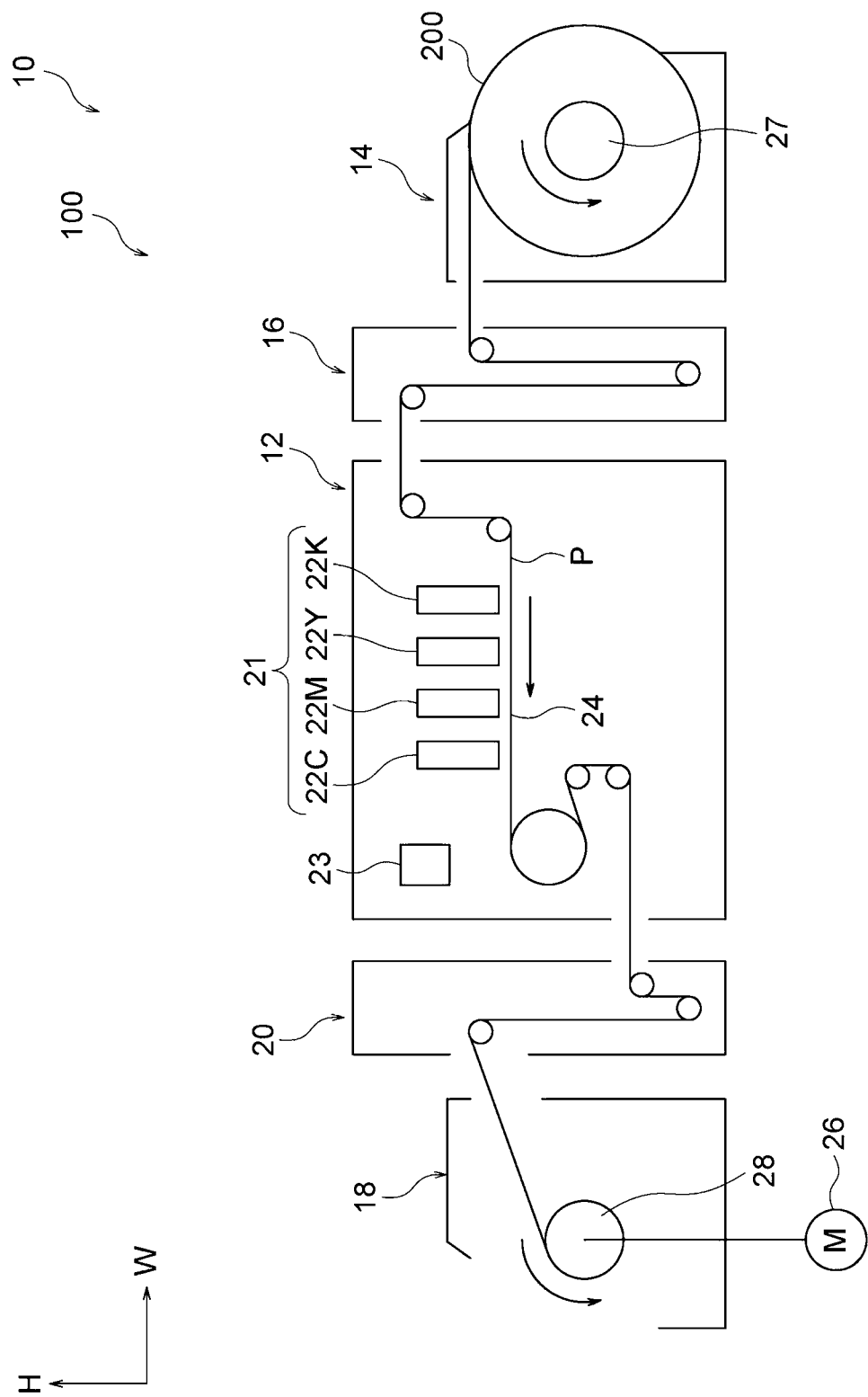
FIG. 7 is a schematic illustration depicting an image forming apparatus installed in an image forming unit according to the first exemplary embodiment of the present disclosure.

As depicted in FIG. 7, the image forming apparatus 100 includes a forming unit 12 and a preprocessing unit 14. The forming unit 12 forms images on the continuous paper strip P, which serves as a recording medium. The preprocessing unit 14 houses the continuous paper strip P, which is supplied to the forming unit 12. The image forming apparatus 100 further includes a buffer unit 16 and a controller 23. The buffer unit 16 is placed between the forming unit 12 and the preprocessing unit 14 and controls such a parameter as the transported length of the continuous paper strip P, which is supplied from the preprocessing unit 14 to the forming unit 12. The controller 23 controls each unit.

The image forming apparatus 100 further includes a postprocessing unit 18 and a buffer unit 20. The postprocessing unit 18 houses the continuous paper strip P, which is discharged from the forming unit 12. The buffer unit 20 is placed between the forming unit 12 and the postprocessing unit 18 and controls such a parameter as the transported length of the continuous paper strip P, which is discharged from the forming unit 12 to the postprocessing unit 18.

A discharge unit 21 is installed in the forming unit 12, and the discharge unit 21 forms an image by discharging droplets onto the continuous paper strip P, which is transported along a transport path 24 of the continuous paper strip P.

The discharge unit 21 includes discharge heads 22K, 22Y, 22M, and 22C, which discharge droplets onto the continuous paper strip P. The discharge head 22K forms a black (K) image, the discharge head 22Y forms a yellow (Y) image, the discharge head 22M forms a magenta (M) image, and the discharge head 22C forms a cyan (C) image. The discharge heads 22K, 22Y, 22M, and 22C face the continuous paper strip P and are arranged in this order from the upstream side to the downstream side in the transport direction of the continuous paper strip P (hereinafter, referred to simply as a "sheet transport direction")

In the following descriptions, the alphabetical characters K, Y, M, and C, which are appended to the reference signs, are omitted in a case where the colors K, Y, M, and C are not specified.

The preprocessing unit 14 includes a supply reel 27 to which the supply roll 200 is set. The continuous paper strip P, which is supplied to the forming unit 12, is rolled into the supply roll 200. The supply reel 27 is rotatably supported by using a frame member, which is not shown.

The postprocessing unit 18 includes a winding reel 28 to roll the continuous paper strip P, on which images have been formed. The winding reel 28 is driven and rotated by a motor 26 and rolls the continuous paper strip P, and the continuous paper strip P is transported in the direction represented by arrows in FIG. 7 along the transport path 24.

In this configuration, a user sets the supply roll 200 to the supply reel 27 of the image forming apparatus 100. The rotation of the winding reel 28 exerts tension on the continuous paper strip P in the sheet transport direction, and the continuous paper strip P is transported along the transport path 24. Then, each of the discharge heads 22 discharges droplets of the corresponding color onto the continuous paper strip P, which is transported. A drying unit, which is not shown, dries the droplets discharged onto the continuous paper strip P, and thus images are formed on the continuous paper strip P.

Managing Apparatus 30

The managing apparatus 30 depicted in FIG. 8 receives a plurality of print jobs, each of which is a direction to form one or more images on the continuous paper strip P, and creates one or more print groups into which the plurality of print jobs are classified according to print speed.

The term "print job" indicates a process unit of print operation provided as a direction to the image forming apparatus 100 in a print command at a single time. A print job is a piece of image information including such attributes as a print speed, the length required for forming images on the continuous paper strip P, and a dot density (resolution) of images.

Hardware Configuration of Managing Apparatus 30

As depicted in FIG. 6A, the managing apparatus 30 includes a central processing unit (CPU) 31, a read-only memory (ROM) 32, a random-access memory (RAM) 33, a repository 34, and a communication interface (I/F) 35. These units are communicatively coupled to each other via a bus 39.

The CPU 31, which is a central computing processing unit, executes various programs and control of each unit. Specifically, the CPU 31 loads programs from the ROM 32 or the repository 34 and uses the RAM 33 as a working region to execute the programs. The CPU 31 executes control of each unit and various kinds of computing processing in accordance with the programs stored in the ROM 32 or the repository 34. In the present exemplary embodiment, a managing program is stored in the ROM 32 or the repository 34, and the managing program classifies a plurality of print jobs into groups and outputs the classified print jobs to the image forming apparatus 100.

The ROM 32 stores various programs and various kinds of data. The RAM 33 functions as a working region and temporarily retains programs or data. A hard disk drive (HDD) or a solid state drive (SSD) constitutes the repository 34, which stores various programs including the operating system and various kinds of data. The managing apparatus 30 uses the communication interface 35 to communicate with the image forming apparatus 100, and such a standard as the Ethernet (registered trademark), a fiber distributed data interface (FDDI), or Wi-Fi (registered trademark) is used.

While executing the managing program above, the managing apparatus 30 uses the hardware resource described above and realizes various functions. A functional configuration realized by the managing apparatus 30 will be described.

Functional Configuration of Managing Apparatus 30

As depicted in FIG. 6B, the managing apparatus 30 includes a job-receiving section 36, an acquiring section 38, and a creating section 40. Each functional section is realized by the CPU 31, which reads and executes the managing program stored in the ROM 32 or the repository 34.

The job-receiving section 36 receives a plurality of print jobs from outside. The acquiring section 38 acquires the information regarding a plurality of supply rolls 200 possessed by the image forming unit 10. Specifically, a single image forming operation sometimes does not consume all of the continuous paper strip P rolled into a supply roll 200. Thus, the remaining length of a rolled continuous paper strip P is different for each of the supply rolls 200. The acquiring section 38 acquires the information regarding the remaining length of the continuous paper strip P rolled into each of the supply rolls 200 that are currently possessed by the image forming unit 10. The creating section 40 creates print groups into which print jobs that are input into the job-receiving section 36 are classified according to print speed.

Operations of Major Constituents

Next, operations of the managing apparatus 30 and the image forming unit 10 will be described with reference to the flowchart depicted in FIG. 1.

Figure 1:
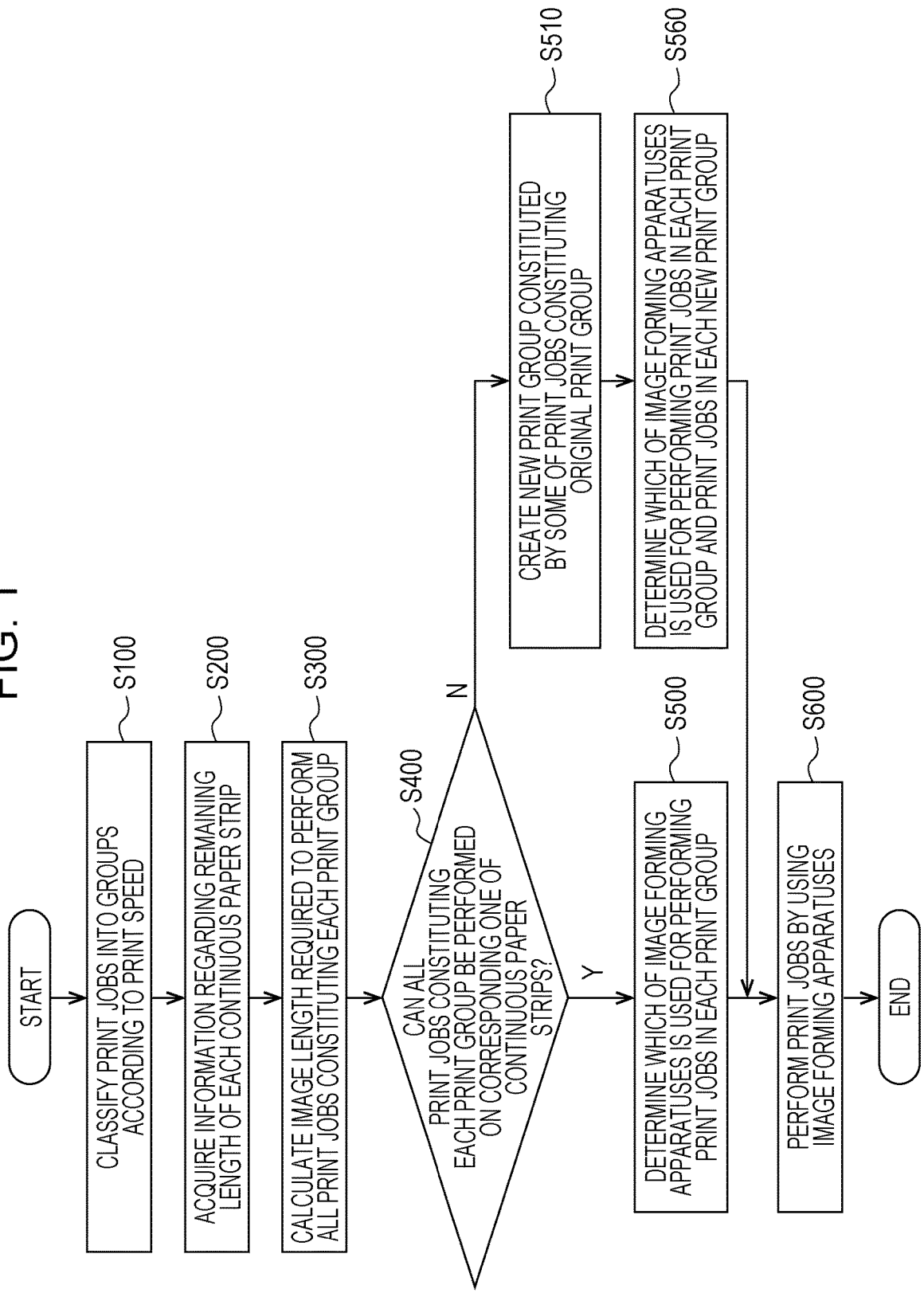
FIG. 1 is a flowchart depicting a managing flow of print jobs that are performed by a managing apparatus according to a first exemplary embodiment of the present disclosure.

In step S100 in FIG. 1, the job-receiving section 36 of the CPU 31 receives a plurality of print jobs each of which includes such attributes as a print speed and the length required for forming images on a continuous paper strip P. After a plurality of print jobs to be performed in a predetermined day are selected from the received print jobs and are set, the creating section 40 of the CPU 31 classifies the plurality of print jobs into one or more groups according to print speed and creates one or more print groups. If the plurality of print jobs all have the same print speed, the CPU 31 creates a single print group. In other words, the CPU 31 classifies the plurality of print jobs so that a print group includes no print job having a different print speed. In the present exemplary embodiment, as depicted in FIG. 2, eight print jobs denoted by print jobs A to H are print jobs to be performed in a predetermined day.

In the present exemplary embodiment, the print speeds for print jobs in a speed priority mode, in a standard mode, and in a high quality mode are different. The print speed is prioritized over the image resolution in the speed priority mode. The print speed and the resolution are equally prioritized in the standard mode. The resolution is prioritized over the print speed in the high quality mode. For example, the print speed for a print job in the speed priority mode is 150 m/min, the print speed for a print job in the standard mode is 80 m/min, and the print speed for a print job in the high quality mode is 50 m/min.

Figure 2:
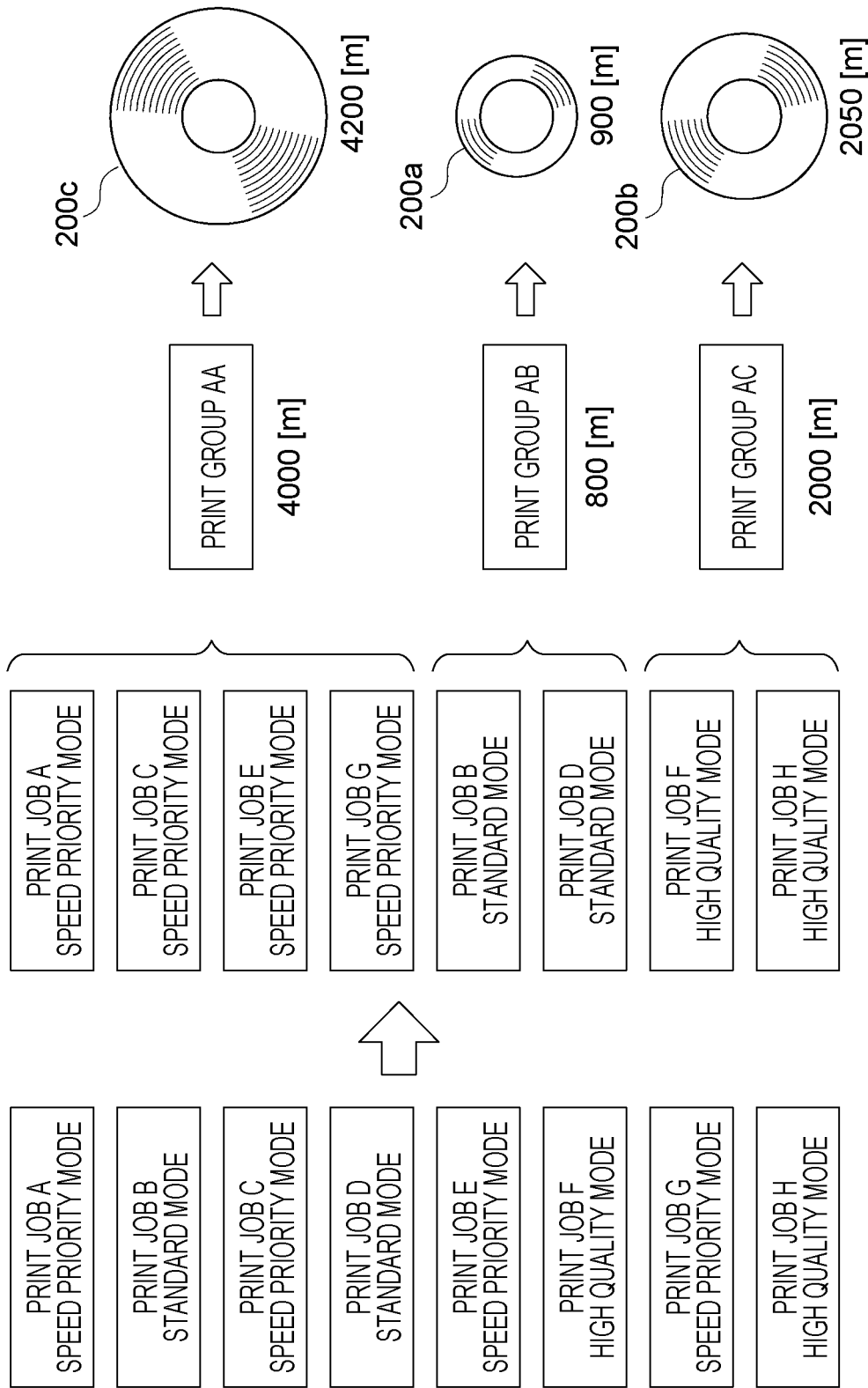
FIG. 2 is an illustration used to describe the managing flow of print jobs that are performed by the managing apparatus according to the first exemplary embodiment of the present disclosure.

As depicted in FIG. 2, the print jobs A, C, E, and G are in the speed priority mode, the print jobs B and D are in the standard mode, and the print jobs F and H are in the high quality mode. Thus, the CPU 31 creates a print group AA constituted by the print jobs A, C, E, and G, a print group AB constituted by the print jobs B and D, and the print group AC constituted by the print jobs F and H. In this way, in the present exemplary embodiment, the CPU 31 creates three print groups.

Next, in step S200, the acquiring section 38 of the CPU 31 acquires the information regarding the remaining length of the continuous paper strip P rolled into each of the plurality of supply rolls 200 that are currently possessed by the image forming unit 10. In the present exemplary embodiment, as depicted in FIG. 5, three supply rolls 200a, 200b, and 200c are possessed by the image forming unit 10. The remaining length of the continuous paper strip P rolled into the supply roll 200a is 900 m, the remaining length of the continuous paper strip P rolled into the supply roll 200b is 2050 m, and the remaining length of the continuous paper strip P rolled into the supply roll 200c is 4200 m.

Then, in step S300, the CPU 31 calculates the length of a continuous paper strip P on which images are formed by performing the print jobs constituting each of the print groups (hereinafter, this length is referred to as an "image length"). In other words, the CPU 31 calculates the minimum length required to perform the print jobs constituting a print group on a continuous paper strip P. In the present exemplary embodiment, as an example, the image length for the print group AA, which is constituted by the print jobs in the speed priority mode, is determined to be 4000 m as depicted in FIG. 2. The image length for the print group AB, which is constituted by the print jobs in the standard mode, is determined to be 800 m. Further, the image length for the print group AC, which is constituted by the print jobs in the high quality mode, is determined to be 2000 m.

Subsequently, in step S400, the CPU 31 determines whether all the print jobs constituting each of the print groups can be performed on a continuous paper strip P rolled into the corresponding one of the supply rolls 200. If all the print jobs constituting a print group can be performed on a continuous paper strip P rolled into one of the supply rolls 200 for all the print groups, the process proceeds to step S500. If not all of the print jobs constituting a print group can be performed on a continuous paper strip P rolled into one of the supply rolls 200 for one or more print groups, the process proceeds to step S510.

A description will be given of a reason that it needs to be determined whether all the print jobs constituting a print group can be performed on the continuous paper strip P rolled into one of the supply rolls 200.

Figure 4A:
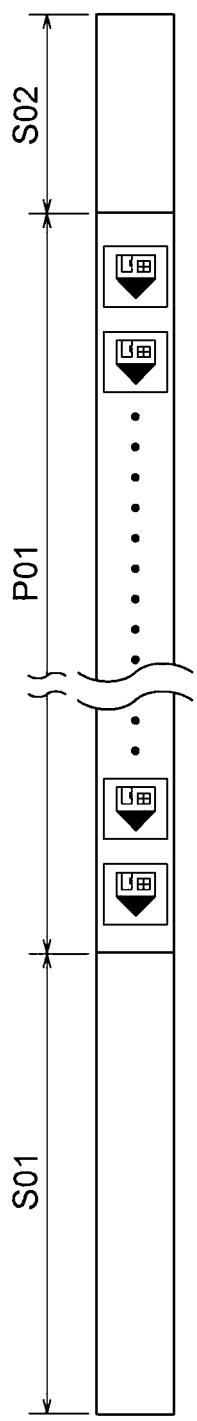
FIGS. 4A, 4B, and 4C are illustrations used to describe wasted portions generated by print jobs that are performed by the managing apparatus according to the first exemplary embodiment of the present disclosure.

FIG. 4A depicts images obtained by a print job in the speed priority mode that is performed on a continuous paper strip P. As depicted in FIG. 4A, unused regions (hereinafter, referred to as "wasted portions") in which no image is formed are generated, one each on opposite sides of an image region (P01 in FIG. 4A) in which images are formed. Specifically, the winding reel 28 of the image forming apparatus 100 depicted in FIG. 7 is driven and rotated and rolls the continuous paper strip P, and the continuous paper strip P is transported along the transport path 24. Thus, a wasted portion is generated during an acceleration period until the print speed reaches a preset value and during a deceleration period during which the print speed decreases from the preset value until the transport is stopped. For example, if a print job in the speed priority mode is performed on the continuous paper strip P, the length of the wasted portion during acceleration (S01 in FIG. 4A) is about 70 m, and the length of the wasted portion during deceleration (S02 in FIG. 4A) is about 30 m.

The term "wasted portion" indicates an unused region in which no image is formed, as described above. In other words, a wasted portion is a region in which no image can be formed by performing a print job.

Figure 4B:
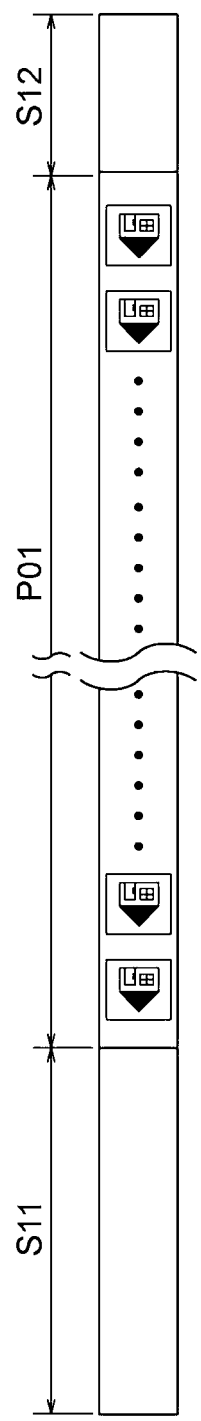

FIG. 4B depicts images obtained by a print job in the standard mode that is performed on a continuous paper strip P. As depicted in FIG. 4B, wasted portions are generated, one each on opposite sides of an image region P01. For example, if a print job in the standard mode is performed on the continuous paper strip P, the length of the wasted portion during acceleration (S11 in FIG. 4B) is about 45 m, and the length of the wasted portion during deceleration (S12 in FIG. 4B) is about 20 m.

Figure 4C:
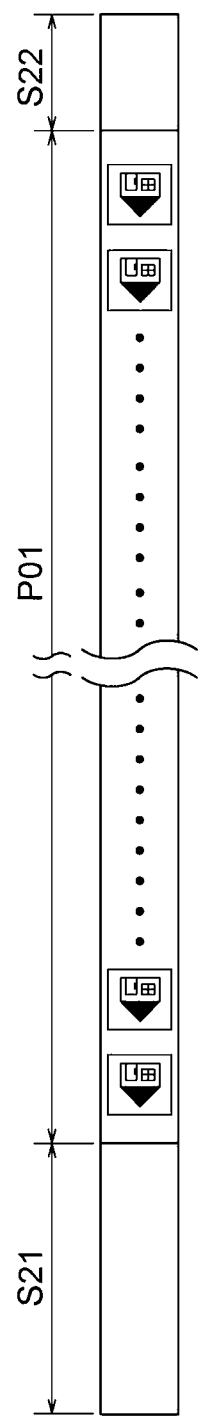

FIG. 4C depicts images obtained by a print job in the high quality mode that is performed on a continuous paper strip P. As depicted in FIG. 4C, wasted portions are generated, one each on opposite sides of an image region P01. For example, if a print job in the high quality mode is performed on the continuous paper strip P, the length of the wasted portion during acceleration (S21 in FIG. 4C) is about 25 m, and the length of the wasted portion during deceleration (S22 in FIG. 4C) is about 15 m.

As described above, all the print jobs constituting a print group have the same print speed. Thus, when a print job in a print group is finished and thereafter another print job in the same print group is performed, the print speed need not be changed, and thus no wasted portion is generated. Consequently, when all the print jobs constituting a print group are performed in succession, a wasted portion is generated during acceleration before the first print job is performed and during deceleration after the last print job is performed.

As described above, if all the print jobs constituting a print group can be performed on the continuous paper strip P rolled into a single supply roll 200, the amount of wasted portion can be reduced.

In the present exemplary embodiment, the image length of the print group AA, which is constituted by print jobs in the speed priority mode, is 4000 m, and a continuous paper strip P whose length is 4100 m is necessary if the wasted portions generated during acceleration and deceleration are taken into account, as described above. Thus, all the print jobs constituting the print group AA can be performed on a continuous paper strip P having a length of 4200 m remaining, which is rolled into the supply roll 200c (refer to FIG. 2). Then, the CPU 31 associates the print group AA with the supply roll 200c.

The image length of the print group AB, which is constituted by print jobs in the standard mode, is 800 m, and a continuous paper strip P whose length is 865 m is necessary if the wasted portions generated during acceleration and deceleration are taken into account. Thus, all the print jobs constituting the print group AB can be performed on a continuous paper strip P having a length of 900 m remaining, which is rolled into the supply roll 200a (refer to FIG. 2). Then, the CPU 31 associates the print group AB with the supply roll 200a.

Further, the image length of the print group AC, which is constituted by print jobs in the high quality mode, is 2000 m, and a continuous paper strip P whose length is 2040 m is necessary if the wasted portions generated during acceleration and deceleration are taken into account. Thus, all the print jobs constituting the print group AC can be performed on a continuous paper strip P having a length of 2050 m remaining, which is rolled into the supply roll 200b (refer to FIG. 2). Then, the CPU 31 associates the print group AC with the supply roll 200b.

The term "associate" means that a print group is associated with a continuous paper strip P, and a supply roll 200 (continuous paper strip P) used to perform the print jobs constituting the print group is specified.

If a first print job and a second print job that have different print speeds are performed, a wasted portion appears between the image region of the first print job and the image region of the second print job. Specifically, the transport of a continuous paper strip P needs to be stopped after the first print job has been performed and before the second print job is performed. Thus, a wasted portion, which is generated during deceleration in the first print job, and another wasted portion, which is generated during acceleration in the second print job, appear between the image region of the first print job and the image region of the second print job.

Then, in step S500, the CPU 31 determines which of the image forming apparatuses 100 is used for performing the print jobs in each of the print groups.

Then, in step S600, each of the image forming apparatuses 100 performs the print jobs constituting the corresponding print group. Specifically, a user sets to the supply reel 27 of the image forming apparatus 100 the supply roll 200 into which the continuous paper strip P associated with (assigned to) the print group is rolled. Then, the image forming apparatus 100 performs the print jobs constituting the print group that is output by the managing apparatus 30. A series of operations is finished in this way.

If not all of the print jobs constituting a print group can be performed on the continuous paper strip P rolled into one of the supply rolls 200 and the process proceeds to step S510, the CPU 31 creates new print groups in step S510. Specifically, the CPU 31 creates new print groups each of which is constituted by some of the print jobs constituting the original print group so that all the print jobs constituting each of the new print groups can be performed on the continuous paper strip P rolled into a corresponding one of the supply rolls 200.

In a case, for example, the print jobs A, C, E, and G constituting the print group AA depicted in FIG. 3 cannot be performed on the continuous paper strip P rolled into a supply roll 200. In such a case, the CPU 31 creates a new print group AAA, which is constituted by the print job A and the print job C, and a new print group AAB, which is constituted by the print job E and the print job G, so that all the print jobs can be performed on the continuous paper strip P rolled into a supply roll 200.

Then, the CPU 31 associates each of the new print groups AAA and AAB with the corresponding one of the supply rolls 200.

Next, in step S560, the CPU 31 determines which of the image forming apparatuses 100 is used for performing the print jobs in each of the print groups and which of the image forming apparatuses 100 is used for performing the print jobs in each of the new print groups.

Then, the procedure in step S600 described above is performed, and a series of operations is finished.

Summarization

As described above, in the managing apparatus 30, the CPU 31 creates one or more print groups into which one or more print jobs are classified according to print speed. The print jobs constituting a print group are performed on a continuous paper strip P, and thus no wasted portion is generated between a print job included in the print group and another print job included in the print group. Thus, a wasted portion generated on a continuous paper strip P is caused to become smaller than in a case where print jobs having different print speeds are performed on a continuous paper strip P in the order in which the print jobs are received.

Further, in the managing apparatus 30, the CPU 31 takes into account the remaining length of a continuous paper strip P and associates a print group with a supply roll 200 so that all the print jobs constituting the print group can be performed on the continuous paper strip P rolled into the supply roll 200. Consequently, all the print jobs constituting the print group can be performed on the supply roll 200 without the change of the supply roll 200 (continuous paper strip P).

Further, in the managing apparatus 30, if not all of the print jobs constituting a print group can be performed on a supply roll 200, the CPU 31 creates new print groups so that all the print jobs can be performed on the continuous paper strip P rolled into a supply roll 200. Then, the CPU 31 associates each of the new print groups with the corresponding one of the supply rolls 200. Consequently, all the print jobs constituting a new print group can be performed on a supply roll 200 without the change of the supply roll 200 (continuous paper strip P).

In addition, the consumption of a continuous paper strip P is reduced in the image forming unit 10 because a wasted portion generated on a continuous paper strip P is caused to become smaller than in a case where print jobs having different print speeds are performed on a continuous paper strip P in the order in which the print jobs are received.

Second Exemplary Embodiment

An example of a managing apparatus and an image forming unit according to a second exemplary embodiment of the present disclosure will be described with reference to FIGS. 9 and 10. The description regarding the second exemplary embodiment will focus on features that differ from the features of the first exemplary embodiment.

Figure 9:
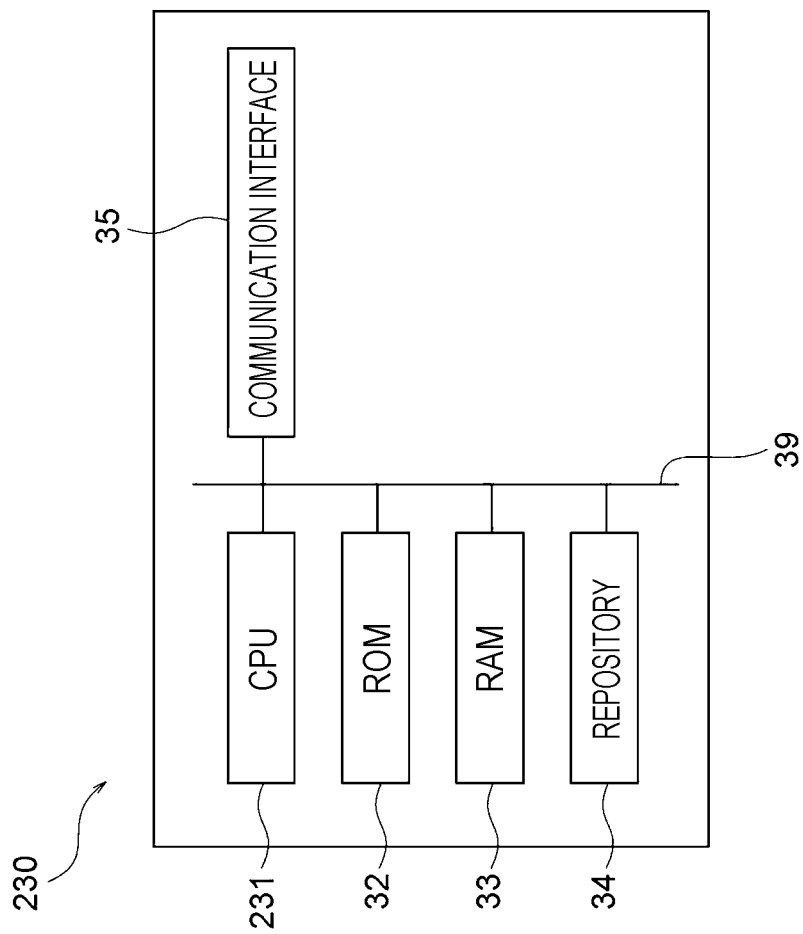
FIG. 9 is a block diagram depicting a hardware configuration of a managing apparatus according to a second exemplary embodiment of the present disclosure.

A managing apparatus 230 according to the second exemplary embodiment includes a CPU 231, a ROM 32, a RAM 33, a repository 34, and a communication interface (I/F) 35 as depicted in FIG. 9. These units are communicatively coupled to each other via a bus 39.

The CPU 231 determines the order of performing a plurality of print jobs constituting a print group so that the dot density of an image formed on a continuous paper strip P by the print job performed first of the plurality of print jobs is higher than the dot density of an image formed on the continuous paper strip P by the print job performed last. Specifically, as depicted in FIG. 10, the CPU 231 determines the order of performing print jobs so that the dot density of an image formed on a continuous paper strip P gradually decreases from the dot density for the print job performed first to the dot density for the print job performed last.

Figure 10:
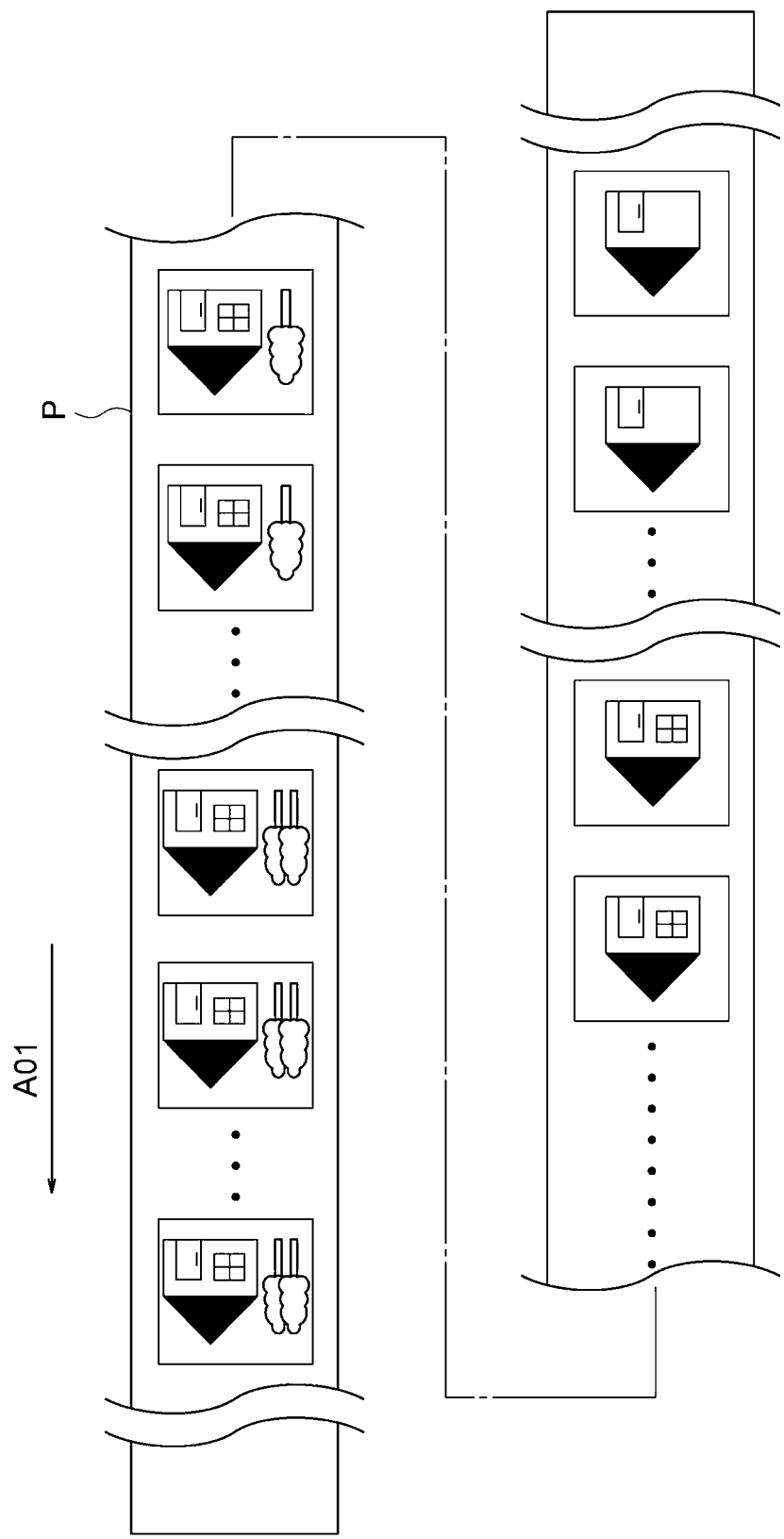
FIG. 10 is an illustration used to describe images that are formed on a continuous paper strip by print jobs that are performed by the managing apparatus according to the second exemplary embodiment of the present disclosure.

The arrow A01 in FIG. 10 indicates the transport direction of the continuous paper strip P. Namely, the dot density of an image located on the tip side of the arrow A01 is higher than the dot density of an image located on the base side of the arrow A01.

A portion of the continuous paper strip P where an image having a higher dot density is formed is heavier than a portion of the continuous paper strip P where an image having a lower dot density is formed. A portion of the continuous paper strip P on the tip side of the arrow A01, where an image having a higher dot density is formed, is rolled by the winding reel 28 of the image forming apparatus 100 (refer to FIG. 7) earlier than a portion of the continuous paper strip P on the base side of the arrow A01, where an image having a lower dot density is formed. The term "dot density" indicates the concentration of dots in a unit area of an image formed on the continuous paper strip P.

As described above, in the image forming apparatus 100 depicted in FIG. 7, the winding reel 28 is driven and rotated by the motor 26, and thus the continuous paper strip P is rolled by the winding reel 28 and transported along the transport path 24. Thus, the moment of inertia about the winding reel 28 exerted on the motor 26 is smaller in a case where the portion of the continuous paper strip P rolled into the inner side in the radial direction of the winding reel 28 is heavy than in a case where the portion of the continuous paper strip P rolled into the outer side in the radial direction of the winding reel 28 is heavy. In other words, the power consumption of the motor 26 is reduced.

As described above, the CPU 231 determines the order of performing a plurality of print jobs constituting a print group so that the dot density of an image formed on the continuous paper strip P by the print job performed first of the plurality of print jobs is higher than the dot density of an image formed on the continuous paper strip P by the print job performed last. Thus, the power consumption of the managing apparatus 230 becomes smaller than in a case where print jobs having different dot densities of images are performed on the continuous paper strip P in the order in which the print jobs are received.

The CPU 231 determines the order of performing print jobs so that the dot density of an image formed on the continuous paper strip P gradually decreases from the dot density for the print job performed first to the dot density for the print job performed last. Thus, the power consumption of the managing apparatus 230 becomes smaller than in a case where print jobs are performed so that the dot density repeatedly increases and decreases.

Third Exemplary Embodiment

An example of a managing apparatus and an image forming unit according to a third exemplary embodiment of the present disclosure will be described with reference to FIGS. 11 to 13. The description regarding the third exemplary embodiment will focus on features that differ from the features of the first exemplary embodiment.

Figure 11:
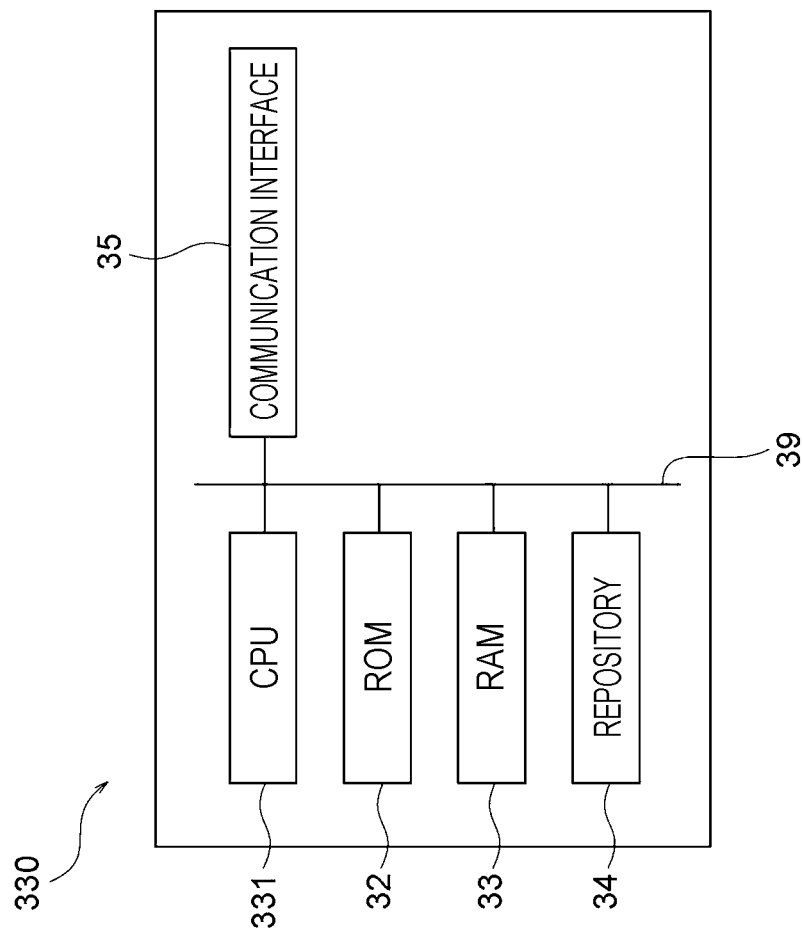
FIG. 11 is a block diagram depicting a hardware configuration of a managing apparatus according to a third exemplary embodiment of the present disclosure.

A managing apparatus 330 according to the third exemplary embodiment includes a CPU 331, a ROM 32, a RAM 33, a repository 34, and a communication interface (I/F) 35 as depicted in FIG. 11. These units are communicatively coupled to each other via a bus 39.

The CPU 331 determines the order of print jobs so that a first print job and a second print job are alternately performed, where for the first print job, the dot density of an image in a portion on one side in the width direction of a continuous paper strip P is higher than the dot density of an image in a portion on the other side and for the second print job, the dot density of an image in a portion on the other side in the width direction of the continuous paper strip P is higher than the dot density of an image in a portion on the one side (refer to FIG. 12).

Thus, as depicted in FIGS. 13A, 13B, 13C, and 13D, the continuous paper strip P, on which images are formed and which is rolled by the winding reel 28, bulges in the radial direction of the winding reel 28 in a portion on one side in the width direction of the continuous paper strip P and thereafter bulges in the radial direction of the winding reel 28 in a portion on the other side in the width direction of the continuous paper strip P. In this way, the portion on the one side in the width direction of the continuous paper strip P and the portion on the other side alternately bulge. Thus, if print jobs have different dot densities of images in a portion on one side and in a portion on the other side in the width direction of the continuous paper strip P, the deformation generated in the continuous paper strip P rolled by the winding reel 28 becomes smaller than in a case where the print jobs are performed on the continuous paper strip P in the order in which the print jobs are received.

The specific exemplary embodiments according to the present disclosure have been described in detail, but the present disclosure is not limited to the exemplary embodiments described above. It will be apparent to those skilled in the art that various other embodiments are possible without departing from the scope of the present disclosure. For example, a plurality of print jobs constitute each of the print groups AA, AB, and AC in the above exemplary embodiments, but a single print job may constitute a print group.

Further, the CPU 31 creates the three print groups AA, AB, and AC in the above exemplary embodiments but may create a single print group instead of a plurality of print groups.

In the second exemplary embodiment, the CPU 231 determines the order of performing print jobs so that the dot density of an image formed on the continuous paper strip P gradually decreases from the dot density for the print job performed first to the dot density for the print job performed last. But it is sufficient that the dot density of an image formed on the continuous paper strip P by the print job performed first be higher than the dot density of an image formed on the continuous paper strip P by the print job performed last. However, in this case, the effect caused by a gradual decrease in the dot density does not occur.

In the exemplary embodiments described above, the CPU 31, 231, or 331 loads software (a program) and executes the process, but the process may be executed by various processors other than a CPU. Examples of such a processor include a programmable logic device (PLD), such as a field-programmable gate array (FPGA), whose circuit configuration is modifiable after fabrication, and a dedicated electric circuit, such as an application specific integrated circuit (ASIC), which is a processor having a circuit configuration exclusively designed to execute a specific process. Further, image transmission processing, image distribution processing, and display processing may be performed by one of the various processors described above or by a combination of two or more similar or dissimilar processors (for example, a combination of a plurality of FPGAs or a combination of a CPU and an FPGA). More specifically, the hardware structure of these various processors is an electric circuit formed by a combination of circuit elements such as semiconductor devices.

Further, in the above exemplary embodiments, the mode in which a program is stored (installed) in the ROM 32 or the repository 34 in advance has been described, but the present disclosure is not limited to these examples. The program may be stored in a recording medium and provided. Examples of the recording medium include a compact disc read-only memory (CD-ROM), a digital versatile disc read-only memory (DVD-ROM) and a universal serial bus (USB) memory. Alternatively, the program may be downloaded from an external apparatus via a network.

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A managing apparatus comprising:
   a processor configured to
      use a plurality of continuous paper strips as recording media and receive a plurality of print jobs having different print speeds;
      create print groups into which the plurality of print jobs are classified according to print speed;
      acquire a remaining length of each of the plurality of continuous paper strips on which images are not yet formed and an image length which is a length of a continuous paper strip on which images are expected to be formed by performing the print jobs constituting each of the print groups;
      compare the remaining length of each of the plurality of continuous paper strips to the image length of each of the print groups; and
      associate each of the print groups with a corresponding one of the continuous paper strips so that all the print jobs constituting each of the print groups are performed on the corresponding one of the plurality of continuous paper strips.

2. The managing apparatus according to claim 1, wherein the processor is configured to divide the print group into a plurality of new print groups in the case where the image length is longer than the remaining length.

3. The managing apparatus according to claim 1, wherein the processor is configured to determine an order of performing the print jobs so that a dot density of an image formed on one of the plurality of continuous paper strips by a print job performed first of the print jobs constituting one of the print groups is higher than a dot density of an image formed on the one of the plurality of continuous paper strips by a print job performed last.

4. The managing apparatus according to claim 2, wherein the processor is configured to determine an order of performing the print jobs so that a dot density of an image formed on one of the plurality of continuous paper strips by a print job performed first of the print jobs constituting one of the print groups is higher than a dot density of an image formed on the one of the plurality of continuous paper strips by a print job performed last.

5. The managing apparatus according to claim 3, wherein the processor is configured to determine an order of performing the print jobs so that a dot density of an image formed on the one of the plurality of continuous paper strips gradually decreases from a dot density of an image formed by a print job performed first of the print jobs constituting one of the print groups to a dot density of an image formed by a print job performed last.

6. The managing apparatus according to claim 4, wherein the processor is configured to determine an order of performing the print jobs so that a dot density of an image formed on the one of the plurality of continuous paper strips gradually decreases from a dot density of an image formed by a print job performed first of the print jobs constituting one of the print groups to a dot density of an image formed by a print job performed last.

7. A managing apparatus comprising:
   a processor configured to
      use a plurality of continuous paper strips as recording media and receive a plurality of print jobs having different print speeds;

create print groups into which the plurality of print jobs are classified according to print speed; and determine an order of performing the print jobs so that a dot density of an image formed on one of the plurality of continuous paper strips by a print job performed first of the print jobs constituting one of the print groups is higher than a dot density of an image formed on the one of the continuous paper strips by a print job performed last of the print jobs constituting the one of the print groups.

8. A non-transitory computer readable medium storing a program causing a computer to execute a process for management, the process comprising:

using plurality of continuous paper strips as recording media and receiving a plurality of print jobs having different print speeds;

creating print groups into which the plurality of print jobs are classified according to print speed;

acquiring a remaining length of each of the plurality of continuous paper strips on which images are not yet formed and an image length which is a length of a continuous paper strip on which images are expected to be formed by performing the print jobs constituting each of the print groups;

comparing the remaining length of each of the plurality of continuous paper strips to the image length of each of the print groups; and associating each of the print groups with a corresponding one of the plurality of continuous paper strips so that all the print jobs constituting each of the print groups are performed on the corresponding one of the plurality of continuous paper strips.

9. An image forming unit comprising:

a managing apparatus including a processor configured to use a plurality of continuous paper strips as recording media and receive a plurality of print jobs having different print speeds, create print groups into which the plurality of print jobs are classified according to print speed, acquire a remaining length of each of the plurality of continuous paper strips on which images are not yet formed and an image length which is a length of a continuous paper strip on which images are expected to be formed by performing the print jobs constituting each of the print groups, compare the remaining length of each of the plurality of continuous paper strips to the image length of each of the print groups, and associate each of the print groups with a corresponding one of the plurality of continuous paper strips so that all the print jobs constituting each of the print groups are performed on the corresponding one of the plurality of continuous paper strips, and an image formation apparatus that performs on the plurality of continuous paper strips the plurality of print jobs constituting the print groups created by the managing apparatus and that forms images.

* * * * *